United States Patent [19]

Yamada et al.

[11] 4,176,955
[45] Dec. 4, 1979

[54] EXPOSURE METER

[75] Inventors: Seiji Yamada, Sakai; Ichiro Yoshiyama, Kobe; Mashio Kitaura, Tondabayashi, all of Japan

[73] Assignee: Minolta Camera Kabushiki Kaisha, Osaka, Japan

[21] Appl. No.: 820,034

[22] Filed: Jul. 28, 1977

[30] Foreign Application Priority Data

Aug. 4, 1976 [JP] Japan .................... 51-93416
Aug. 10, 1976 [JP] Japan .................... 51-95500

[51] Int. Cl.² .................... G01J 1/42; G03B 7/08
[52] U.S. Cl. .................... 356/222; 356/226; 354/24; 354/31; 354/60 L
[58] Field of Search .......... 356/222, 223, 224, 226, 356/227; 354/23 R, 23 D, 24, 31, 53, 60 R, 60 L

[56] References Cited

U.S. PATENT DOCUMENTS

| 3,741,088 | 6/1973 | Nobusawa | 356/222 |
| 3,772,517 | 11/1973 | Smith | 356/226 X |
| 3,895,875 | 7/1975 | Kitaura et al. | 356/226 |

FOREIGN PATENT DOCUMENTS

| 2405705 | 8/1974 | Fed. Rep. of Germany | 354/23 D |
| 2632893 | 1/1977 | Fed. Rep. of Germany | 356/222 |
| 51-9271 | of 1976 | Japan | 356/226 |

Primary Examiner—Rolf G. Hille
Attorney, Agent, or Firm—Wenderoth, Lind & Ponack

[57] ABSTRACT

An exposure meter provides a display indicating the brightness of selected portions of a scene to be photographed. In one embodiment, a photometering block including a plurality of light sensitive elements is employed, and there is an automatic fixed display indicating the brightness level of the brightest and the darkest portions of the objective scene together with a display of a median value. Another embodiment employs a spot photometering device with only one light sensitive element, and a display of the brightness level of different portions of the scene selected by the photographer.

22 Claims, 12 Drawing Figures

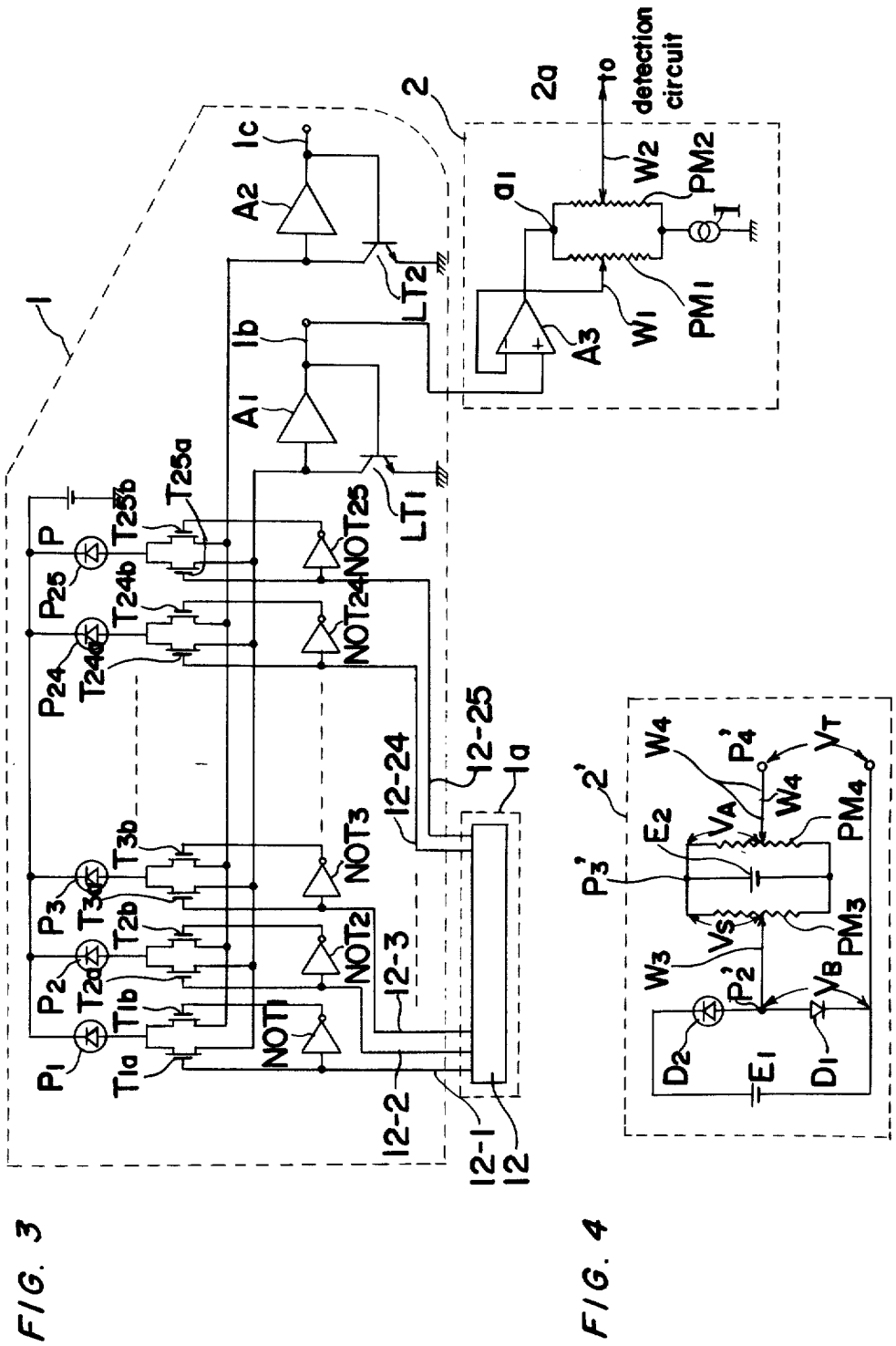

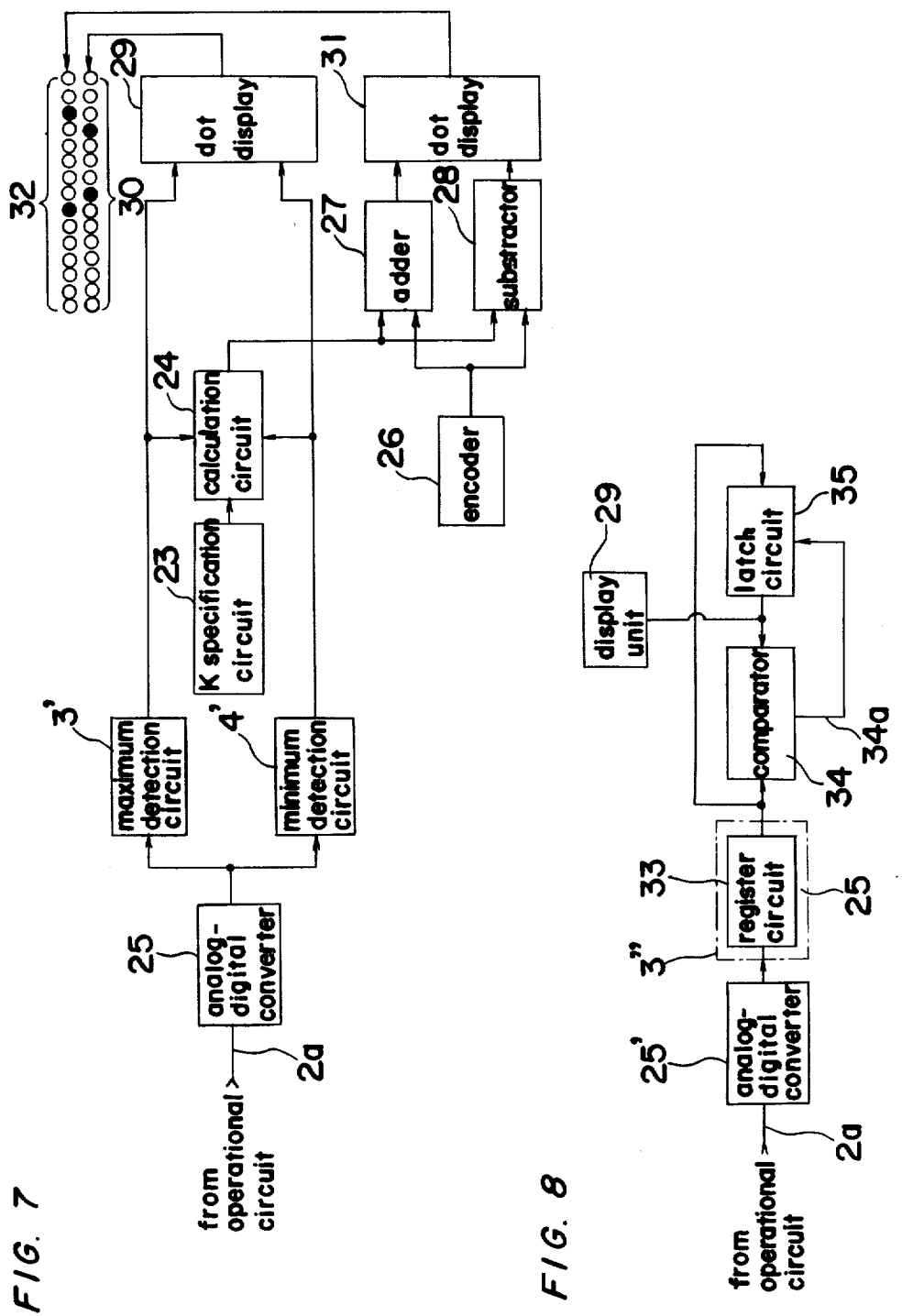

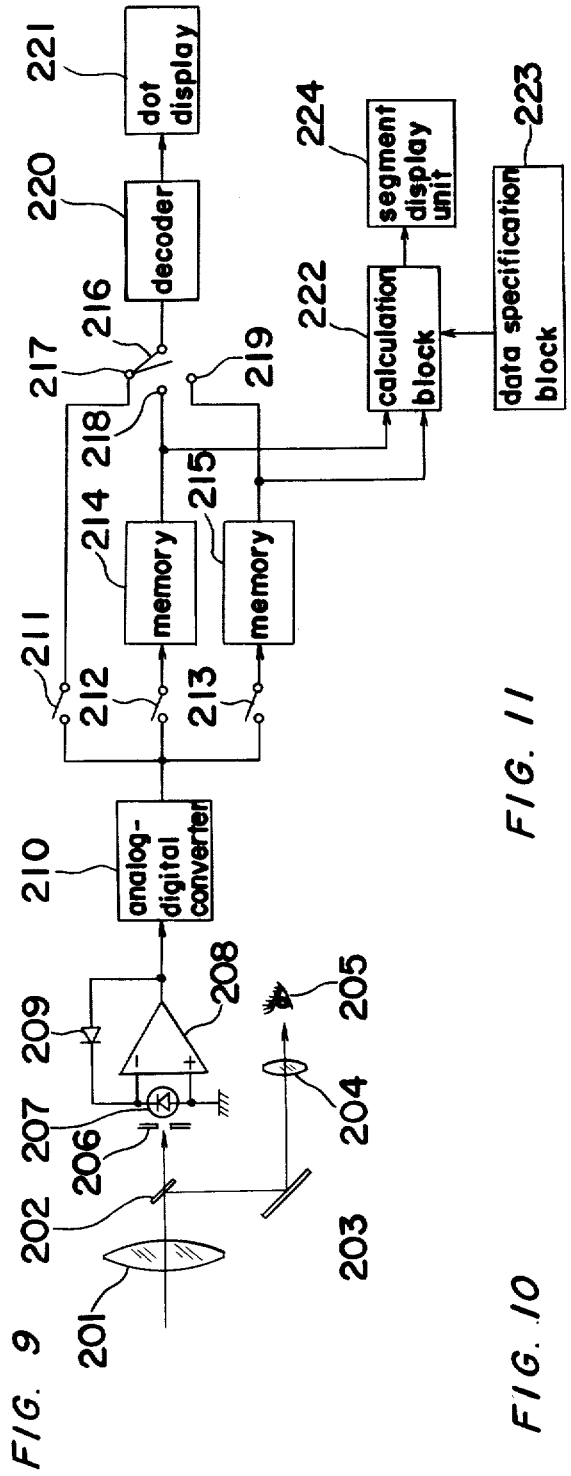

EXPOSURE METER

The present invention relates to an exposure meter for measuring light reflected from an objective scene to be photographed and giving the photographer an indication permitting selection of the requisite time of exposure of the scene and automatically setting the exposure time when automatic control is required. More particularly the invention relates to an improved exposure meter which gives the photographer an immediate and easily appreciable indication of the average brightness and of the brightness of the brightest and the darkest portions of an objective scene.

The amount of light which is allowed to reach the film in a camera, depends on the intensity of the light and the length of time the light is allowed to fall on the film, this latter factor being controllable by varying the lens aperture and the shutter speed. There have been proposed many means and methods for determining the intensity of light falling on or reflected from an objective scene, referred to for simplicity below as the brightness of the objective scene. The simplest type of conventional means is an electric photometer which is directed towards the objective scene and has an indicator that moves to different settings depending on average brightness of the objective scene. A main disadvantage of this known means is that the indicator needle often fails to settle in a fixed position and it is difficult to obtain an exact reading. Another disadvantage is that since the brightness recorded is the average brightness there is often a failure to achieve correct exposure of the main portion of the objective scene. For example, in the same lighting conditions a portion of a photograph carrying the image of a person will be under-exposed if the background is white and over-exposed if the background is black. This problem can be avoided by moving the photometer close to the main portion of the objective scene, to determine its brightness. However, in this case the overall brightness of the objective scene is not known and must therefore be determined by separate measurement, in addition to which it is not always possible to bring the photometer close to the main portion of the objective scene.

Alternatively, it has been proposed to measure the brightness of the brightest and the darkest portions of the objective scene in order to determine the range of brightness and then to set the exposure conditions in accordance with the characteristics of the film employed. This procedure theoretically gives the best results, but in practice it is frequently found difficult to determine rapidly which are brightest and darkest portions of the objective scene and what their relative importance is, and this method is unsuitable when the photographer wishes to take a photograph quickly.

Other proposed methods are to measure the darkest portion of the objective scene and determine the minimum exposure time required, or measure the brightest portion and set the exposure in reference to this portion. Both these methods have the disadvantage that if there is considerable contrast in the objective scene there is over-exposure or under-exposure in portions of the photograph produced.

It is accordingly a principal object of the invention to provide an exposure meter which automatically gives an indication representative of the brightness range and the average brightness of an objective scene to be photographed.

It is another object of the invention to provide an exposure meter which produces easily viewable information on the brightness of an objective scene.

It is a further object of the invention to provide an exposure meter which automatically indicates whether the brightness range of an objective scene exceeds the latitude of the film employed.

It is yet another object of the invention to provide an exposure meter which stores and displays the values of the brightness of different portions of an objective scene measured by spot metering elements.

In accomplishing these and other objects, there is provided, according to the present invention, an exposure meter which comprises an array of photoelectric elements which are disposed to face an objective scene to be photographed.

Each separate photoelectric element produces an electric current in response to incident light as an output signal. This is converted to a value indicative of the required exposure time for given values of lens aperture and sensitivity of the film employed. This is supplied to a means which calculates the highest value of output and the lowest value of output, that is, which determines what exposure times are required by the brightness of the brightest and the darkest portions of the objective scene. These values are displayed by a dot display, which is suitably provided in a viewfinder window or screen, together with a median value. This median value is calculated on the basis of latitude of the film employed and the abovenoted maximum and minimum output values, and is also supplied to an exposure time control circuit.

According to another embodiment of the invention, the value of the brightness of different portions of an objective scene selected by the photographer is recorded and displayed upon actuation of an external switch means by the photographer.

A better understanding of the present invention may be had from the following full description of several preferred embodiments thereof when read with reference to the attached drawings, in which like numbers refer to like parts, and FIG. 1 is a block diagram of an exposure meter according to a first embodiment of the invention;

FIG. 3 is a schematic circuit diagram of a photometering block and an operational circuit for calculation of brightness information;

FIG. 4 is a schematic circuit diagram illustrating the principles of action of the operational circuit of FIG. 3;

FIG. 7 is a block diagram of a modification of the first embodiment of the invention including a digital display giving information relative to film latitude;

FIG. 8 is a block diagram of the maximum value detection circuit employed in the means of FIG. 7;

FIG. 9 is a block diagram of another embodiment of the invention;

FIG. 10 is the plane view of an example of a display employed in the means of FIG. 9;

FIG. 11 is a perspective view of a camera incorporating the means of FIG. 9.

Figures 1, 2:
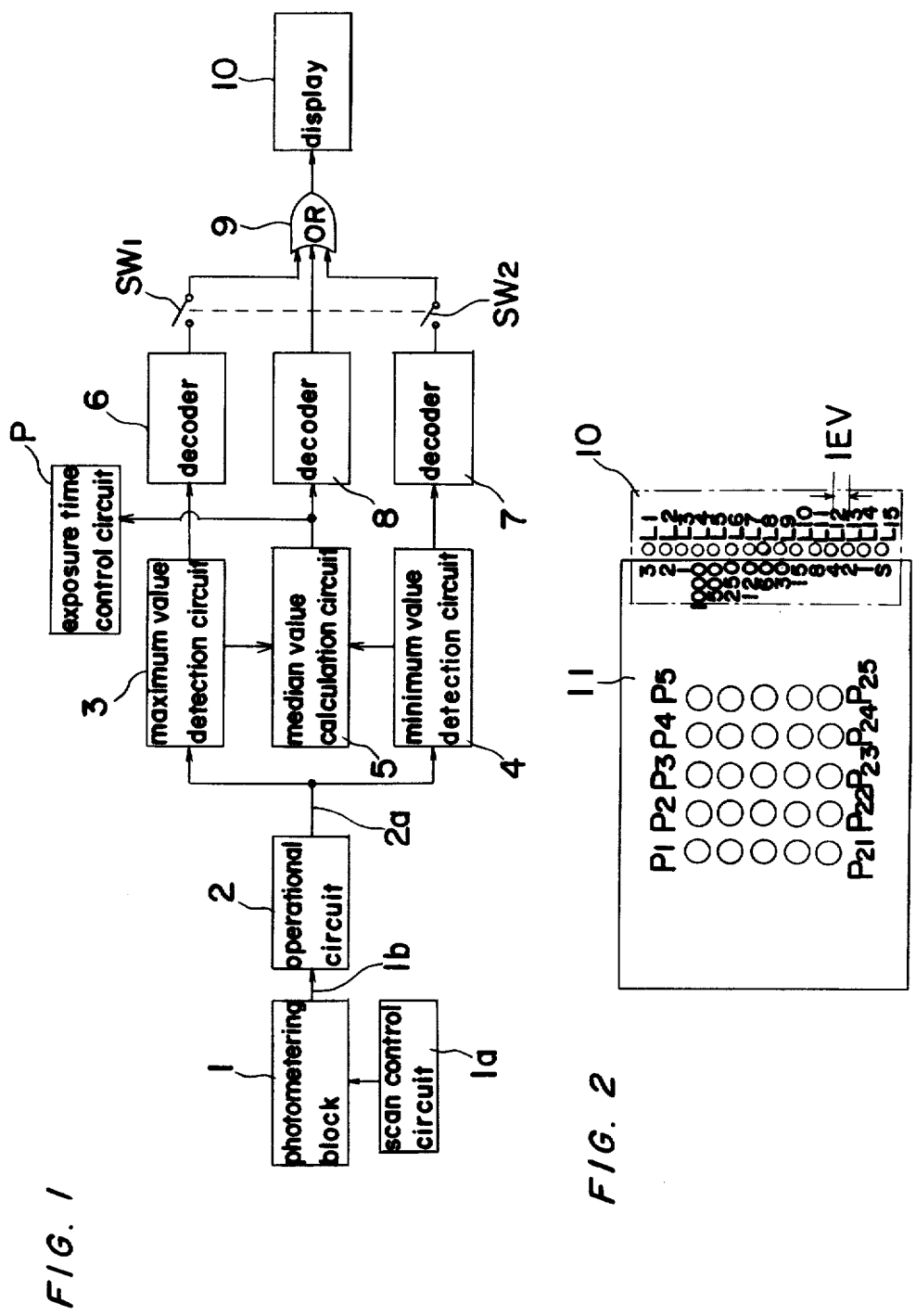
FIG. 2 shows examples of the layout of a photometering block and a brightness display.

Referring initially to FIGS. 1 and 2, successive output signals from photometering block 1 which indicate the intensity of light incident on elements of block 1 are supplied via output line 1b to operational circuit 2 in response to successive input signals to photometering block 1 from scan control circuit 1a of conventional type. Photometering block 1 consists of an array of photodiodes or similar means for production of electrical signals which is suitably, but not essentially, mounted on a camera not shown in a fixed disposition relative to the focal plane of the film employed in the camera. In the specific example shown in FIG. 2, block 1 consists of a 5×5 square array of 25 photodiodes P1 to P25, although, of course, different numbers or other types of photo-elements, or other forms of array may be employed. Light from the objective scene is incident on the entirety of the photometering block 1, but the output from block 1 at any given moment is the output signal from only one of the photodiodes P1 to P25, which supply output signals in their numbered order. Thus, if different portions of the objective have different degrees of brightness, the output signals from photometering block 1 supplied as input to operational circuit 2 vary accordingly.

Operational circuit 2 also receives externally set input indicating the sensitivity of the film employed and the lens aperture, and for given values of film sensitivity and lens aperture produces an output which is proportional to the logarithmn of the value of input supplied thereto by photometering block 1, i.e., which is in effect proportional to the logarithmn of the value of intensity of light incident on successive photodiodes P1 to P25. Operational circuit 2 indicates the requisite exposure time for correct exposure of the different portions of the objective scene whose brightness is detected by the different photodiodes P1 to P25. Output from operational circuit 2 is supplied via line 2a to a maximum value detection circuit 3 and separately to a minimum value detection circuit 4. Maximum value detection circuit 3 produces an output which indicates of the the maximum value of input received from operational circuit 2. This output is supplied to decoder 6 and also to median value calculation circuit 5. Minimum value detection 4 produces an output which indicates of the lowest value of input received from operational circuit 2. This output is supplied to decoder 7 and also to median value calculation circuit 5. The output of median value calculation circuit 5 is supplied to exposure time control circuit P and to decoder 8. Designating the output of maximum value detection circuit 3 as Emax, and that of minimum value detection circuit 4 as Emin, the median value calculation circuit 5 produces an output Emid which is calculated by the formula $$\text{Emid} = (\text{Emax} - \text{Emin})k + \text{Emin} \ldots \quad (1)$$

k being a constant in the range $0 \leq k \leq 1$ which is externally set in order to adjust the value of input supplied to exposure time control circuit P, k being settable at any one of the five values 0, 0.25, 0.5, 0.75, and 1, for example. From Eq. (1) it is seen that (Emid=Emin) when k=0, (Emid=(Emax+Emid)/2) when k=0.5, and (Emid=Emax) when k=1. As an example of the output Emid, if, for given values of film sensitivity and lens aperture, the brightness of the brightest part of the objective scene is such as to require an exposure time of 1/250 second (Emin), and the brightness of the darkest portion of the objective is such as to require an exposure time of 1/15 second (Emax) output Emid supplied to exposure time control circuit P causes circuit P to make the exposure time 1/60 second.

Decoders 6, 7, and 8 all have the same basic construction and change the inputs received from circuits 3, 4, and 5 respectively to a form suitable for actuating display 10. The output from the decoders 6, 7, and 8 may be supplied to display 10 via a common OR gate assembly 9. The output from decoder 8 is always supplied to OR gate assembly 9. The supply of output from decoders 6 and 7 to assembly 9 is dependent on closure of ganged, normally open switches SW1 and SW2, respectively.

Display 10 is a dot display which is suitably constituted by photoemissive diodes, liquid crystal elements, or similar display elements L1 to L15 which are arranged in a single line, as shown in FIG. 2. Display 10 may be provided in the viewfinder system of the camera, where it is immediately viewable by the photographer, and the display elements L1 to L15 may have provided beside them numerals indicating the exposure times they represent, as in the example in the drawing. For display of the abovenoted examples of outputs of circuits 3, 4, and 5, Emax=1/15, Emin=1/250, Emid=1/60, presuming switches SW1 and SW2 are closed, display elements L6, L8 and L10 light up, giving a simple, easily appreciable indication of the range of exposure times necessary for correct exposure of different parts of the objective scene. Since the photographer knows that the shortest and longest exposure times are required for correct exposure of the brightest and darkest portions respectively of the objective scene, he or she may adjust the lens aperture if for example the brightest portion of the objective is the portion for which it is required to effect optimum exposure, and it is observed that there is an extremely wide range between Emax and Emin, with the result that Emid, which is also the control input supplied to exposure time control circuit P of FIG. 1, is very different from Emin, for correct exposure of the brightest portion. More simply, exposure adjustment may be made by altering the value of k set by circuit 23 of FIG. 5, in order to alter the control input supplied to exposure time control circuit P. Note that necessary information is displayed in a very straight forward manner in display 10, and even if display elements L1 to L15 have no indication beside them the photographer may immediately assess the range of values from Emax to Emin, and make any adjustments that may be necessary.

Elements of the means of the invention will now be described with reference to FIGS. 3 through 6.

In FIG. 3, which shows details of photometering block 1, scan control circuit 1a, and operational circuit 2, the cathodes of all the photodiodes P1 to P25 are connected to a common voltage source. The anodes of photodiodes P1, P2, . . . P25 are connected individually through field effect transistors (FET) T1a, T2a, . . . T25a to the collector of NPN transistor LT1 and input of amplifier A1, and through FETs T1b, T2b, . . . T25b to the collector of NPN transistor LT2 and input of amplifier A2. The emitter of transistor LT1 is connected to ground, and amplifier A1 is provided between the base and collector of transistor LT1 and constitutes together therewith a negative feedback amplifier circuit. Amplifier A2 and transistor LT2 are similarly connected. Output terminals 12-1, 12-2, . . . 12-25 of a shift register 12 constituting the scan control circuit 1a connect directly to the gates of FETs T1a, T2a, ... T25a and to the gates of FETs T1b, T2b, ... T25b through inverters NOT1, NOT2, ... NOT25. Upon actuation of an external start means not shown an output signal is produced at each of the output terminals 12-1, 12-2, ... 12-25 of shift register 12 in turn. Thus, at any given moment only one of the FETs T1a to T25a can conduct and therefore an output from only one of the photodiodes P1 to P25, the one that is connected to the currently conductive FET 1a, 2a ... 25a, can be supplied to the transistor LT1 and amplifier A1 circuit. This circuit therefore receives a succession of photocurrent signals from succeeding photodiodes P1, P2, ... P25 as a result of successive outputs from shift register 12. On the other hand, during the action of shift register 12, because of the provision of inverters NOT-1-NOT25, all FETs T1b-T25b conduct except the one that is connected to the shift register terminal 12-1, 12-2, ... 12-25 at which an output signal is currently being produced, and so the output from all the photodiodes P1 to P25 except one is supplied to the transistor LT2 and amplifier A2 circuit.

Provision of amplifier A1 between the base and the collector of transistor LT1 keeps the collector voltage level of transistor LT1 more or less constant, with the result that there appears between base and emitter of transistor LT1, i.e., at output terminal 1b of FIG. 3, a voltage output which is proportional to the logarithmn of the collector current of transistor LT1. Thus, series-out signals that are proportional to the logarithmn of the intensity of light indicated on successive photodiodes P1, P2, ... P25 appear at output terminal 1b.

By a similar action the transistor LT2 and amplifier A2 circuit produces at output terminal 1c an output which is effectively proportional to the logarithmn of total output of photometering block 1.

Output signals from terminal 1b are supplied to the non-inverting input terminal of operational amplifier A3, which constitutes a part of operational circuit 2 as indicated by the dashed-line enclosure of FIG. 3. The inverting input terminal of operational amplifier A3 is connected to wiper W1 of potentiometer PM1 in parallel to potentiometer PM2, and the output terminal is connected to the upper junction a1 of potentiometers PM1 and PM2. The lower junction of potentiometers PM1 and PM2 is connected to constant current circuit I. Wiper W1 of potentiometer PM1 is moved to different settings selected in reference to the sensitivity of film employed by an external setting means not shown and may be calibrated in ASA numbers for example. Wiper W2 of potentiometer PM2 is connected to output terminal 2a and is movable by external means not shown to the different settings selected in reference to lens aperture. Operational circuit 2 produces at output terminal 2a output signals which are equal to the potential between wiper W1 and the upper junction a1 of potentiometers PM1 and PM2 minus the potential between wiper W2 and junction a1 and is indicative of required exposure time. The action of operational circuit 2 is essentially the same as that of a conventionally known circuit for calculating exposure time with reference to APEX indices. The principles of this action are described briefly with reference to a circuit 2' of FIG. 4.

In FIG. 4, the junction P2' of photodiode D2 and diode D1 which are in series with one another and with first voltage source E1 is connected to wiper W3 of potentiometer PM3 which is in parallel to potentiometer PM4. The negative terminal of first voltage source E1 is connected to the cathode of diode D1. Potentiometers PM3 and PM4 are also in parallel to and have an upper junction P3' connecting to the positive terminal of a second voltage source E2. Potential VB across opposite terminals of diode D1 varies in accordance with intensity of light incident on photodiode PD2. Wipers W3 and W4 are set to different settings corresponding to different values of the film sensitivity and the lens aperture, respectively. For any settings of wipers W3 and W4, a voltage Vs appears between wiper W3 and the upper junction P3' of potentiometers PM3 and PM4, and a voltage VA between junction P3' and wiper W4. With this circuit there appears between ground, or a line at a reference voltage, and the output terminal P4' connected to wiper W4 a voltage VT such that $$VT = VB + VS - VA$$

This is equivalent to the known equation for required exposure time Tv using APEX indices $$Tv = Bv + Sv - Av$$

Bv being the luminance index representing the brightness of the scene, Sv the film sensitivity, and Av an index indicating the lens aperture. An equivalent output is obtained if the negative terminal of the second voltage source E2 is connected to upper junction P3' of potentiometers PM3 and PM4. In this case there is a voltage VS' and VA' between junction P3' and wipers W3 and W4 respectively, and output VT is $$VT = VB - VS' + VA'.$$

The basic circuit of FIG. 4 is commonly employed to supply output VT to a shutter control means which controls shutter speed in accordance with the value of VT. In the circuit of FIG. 3, presuming different portions of the objective scene to be photographed have different degrees of brightness, the output at terminal 2a is indicative of the required exposure time but varies in value in succeeding output signals.

Figure 5:
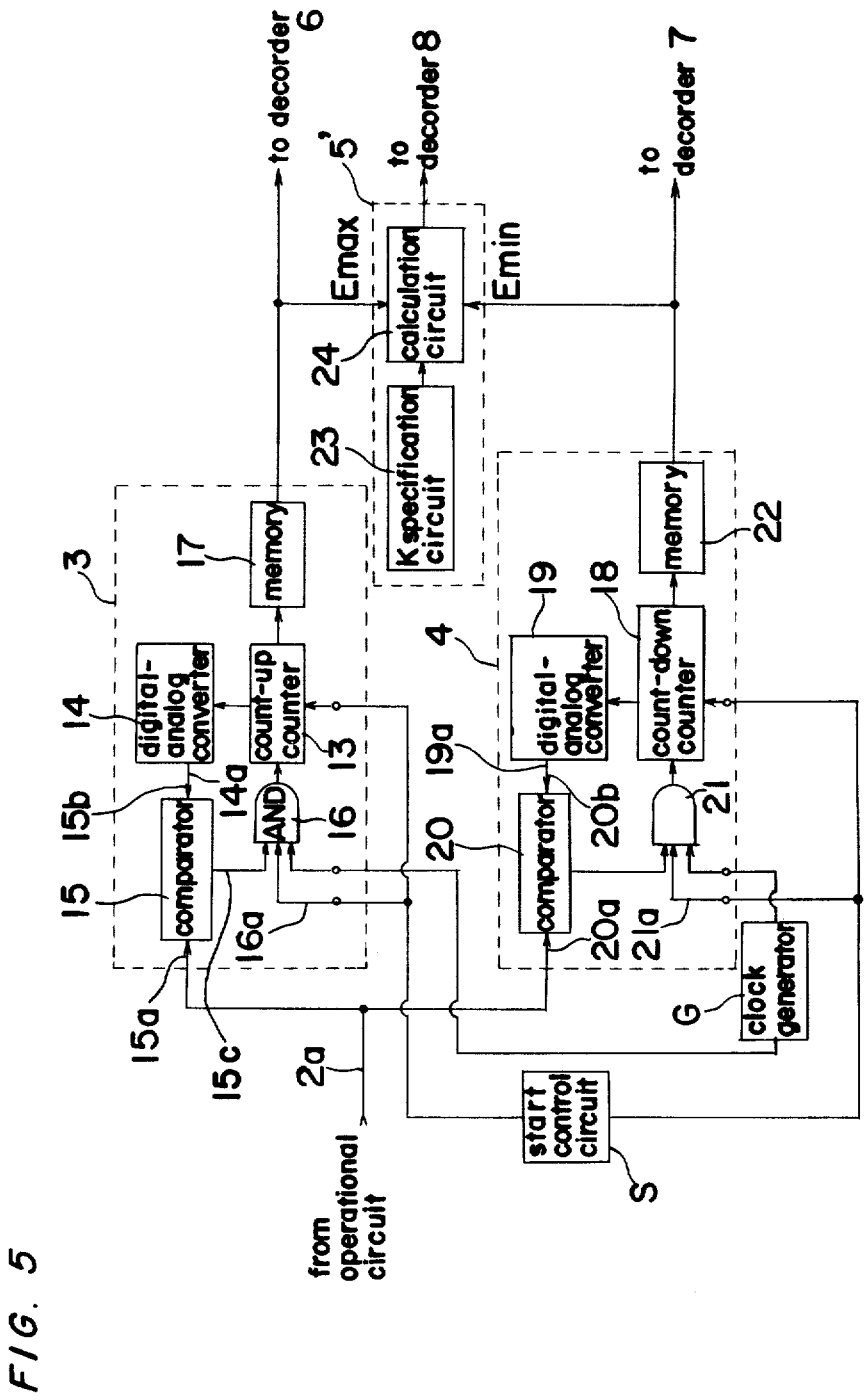
FIG. 5 is a block diagram of a circuit for detecting and calculating maximum, minimum, and median values of the output of the operational circuit of FIG. 3.

Referring now to FIG. 5, maximum value detection circuit 3 and minimum value detection circuit 4 which receive as inputs the output signals from terminal 2a are shown in greater detail. Maximum value detection circuit 3 comprises comparator 15 which receives input from terminal 2a and which, when conditions specified below are satisfied, supplies an output on line 15c to AND gate 16. AND gate 16 three input terminals, and also receives an input of clock pulses from clock generator G and an input from start control circuit S, which supplies a continuous input along line 16a to AND gate 16 upon actuation of an external means not shown such as the scan control circuit 1a. When AND gate 16 receives inputs on lines 15c and 16a, clock signals are passed to and increment the content of count-up counter 13. For each clock pulse received by counter 13, a signal indicating the new content of counter is supplied to memory 17, which stores the content, and to digital-analog (D - A) converter 14, which converts the input signal into an analog output signal which is supplied along line 15b to comparator 15. Thus signals from D - A converter 14 to comparator 15 gradually increase in value as the content of count-up counter 13 increases. At the start of the actuation of maximum value detection circuit 3, a reset signal from a source actuated by start circuit S is supplied to and clears count-up counter 13, and at this time the level of the output from D - A converter 14 is made the lowest level of output produced by converter 14.

Comparator 15 compares the inputs from terminal 2a of operational circuit 2 with the input from D - A converter 14, and, whenever an input signal from terminal 2a is greater than the input from D - A converter 14, supplies a signal along line 15c to AND gate 16, whereupon a further clock pulse is passed through AND gate 16, and the content of counter 13 and memory 17 is incremented, and the value of the output from D - A converter 14 is increased accordingly. Thus, presuming that the brightness of at least some portions of the objective scene is below a certain level, when all the photodiodes P1 to P25 of photometering block 1 have been scanned the content of counter 13 and memory 17 is a numerical value representative of the exposure Emax required for correct exposure of the darkest portion of the objective.

Minimum value detection circuit 4, which has basically the same construction as and functions in a manner analogous to that of maximum value detection circuit 3. It comprises a count-down counter 18, which supplies an input to D - A converter 19 and memory 22 for storing the content of counter 18. Counter 18 receives a reset input at the same time as count-up counter 13 of circuit 3, and receives a count input from AND gate 21 when AND gate 21 receives input clock pulses from clock pulse generator G, an input from start circuit S, and receives an input from comparator 20. Comparator 20 receives an input from terminal 2a of operational circuit 2 and from D - A converter 19, level of which is determined by the input supplied thereto from counter 18. Upon resetting of count-down counter 18, the content of counter 18 is made its maximum value and input supplied thereby to D - A converter 19 is such that level of input from D - A converter 19 to comparator 20 is the highest produceable by D - A converter 19. Comparator 20 compares the input from terminal 2a with the input from D - A converter 19, and when the former is smaller than the latter supplies an input to AND gate 21, which thereupon produces an output which decrements the content of count-down counter 18. Thus, after scanning of photodiodes P1-P25 counter 18 and memory 22 contain values indicative of exposure time required for correct exposure of the brightest portions of the objective.

After completion of scanning of photodiodes P1 to P25, the contents of memory 17 and 22 are supplied to decoders 6 and 7, respectively, and to calculation circuit 24. Calculation circuit 24 together with k specification circuit 23, constituted as an encoder, for example, constitutes the abovementioned calculation circuit 5, for calculation of the value Emid by the abovementioned Eq. (1). Suitably, k is normally set at 0.5, in order to make Emid the mean of Emax and Emin, but may be set to other values in order to adjust the exposure time, as noted above. The constant k may be selected with reference to the latitude of film employed, as noted above, or k may be selected with reference to the contrast and brightness of the objective scene as a whole. The output from Emid calculation circuit 24 is supplied to exposure time control circuit P, and to decoder 8.

Figure 6:
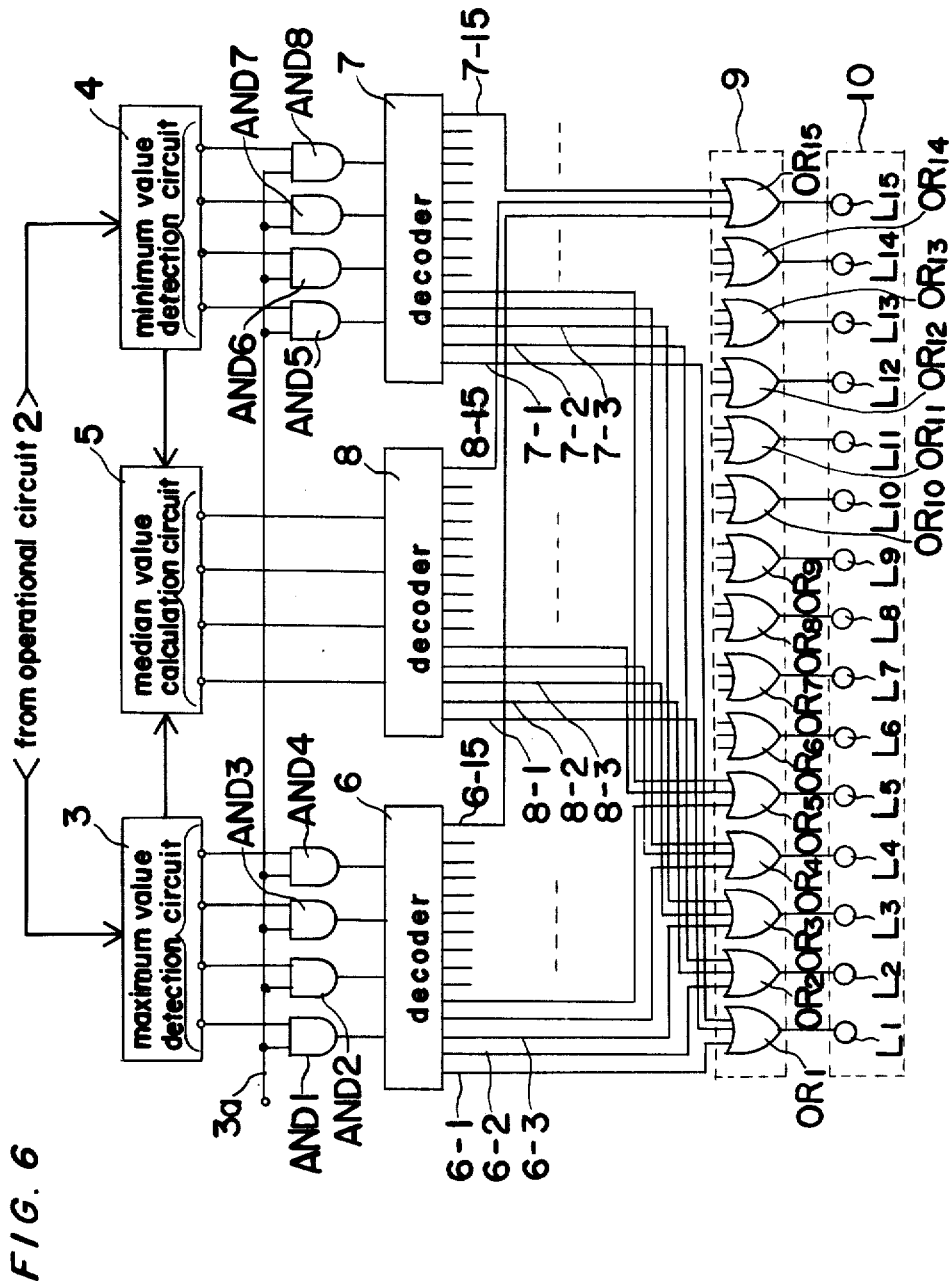
FIG. 6 is a block diagram of a circuit and means for display of the output of the circuit of FIG. 5.

Referring now to FIG. 6, decoders 6,7, and 8 are shown in more detail. Each decoder 6, 7, and 8 has four input terminals for receipt of a binary-coded input. These terminals permit input of a number up to decimal "16" to each decoder, but the decoders can only deal with values up to decimal "15", since an extra "1" is always included in the input, in order to avoid output from the decoders in response to a "0000" input, which could be meaningless.

An input is supplied directly to decoder 8 from Emid calculation circuit 5, the input to decoder 6 must pass through two-input AND gates 1-4, and the input to decoder 7 must pass through two-terminal AND gates 5-8. There is one AND gate for each input terminal of decoders 6 and 7, and one input of each AND gate 1-8 is supplied by line 3a. The AND gates 1-8 correspond to the ganged switches SW1 and SW2 of FIG. 1, and are actuated by an external means not shown. In other words, when an input is supplied along line 3a, an input may be supplied from memories 17 and 22 to decoders 6 and 7, respectively.

Decoder 6, has output terminals 6-1, 6-2, . . . 6-15 which may supply an input signal to OR gates 1, 2, . . . 15, respectively. Decoders 7 and 8 have the same construction as decoder 6, and have output terminals 7-1, 7-2, . . . 7-15 and 8-1, 8-2, . . . 8-15, respectively, each of which terminals may supply an input signal to the correspondingly numbered OR gates 1, 2, . . . 15. Thus, each OR gate 1-15 may receive an input signal from one output terminal of each of the decoders 6, 7, and 8.

The output from OR gates 1, 2, . . . 15 may supply an actuating input signal to photoemissive elements L1, L2, . . . L15, respectively, which constitute the display 10 shown in plane view in FIG. 2. With this arrangement, therefore, simultaneous display of Emax, Emin, and Emid values can be effected in display 10, as noted earlier, the Emid value being shown upon actuation of start circuit S of FIG. 5, and Emax and Emin values being shown when required by actuation of an external means by the photographer.

In this manner the invention permits a very rapid and easy assessment of the required exposure conditions, but at the same time making possible a highly accurate display of this assessment, and permitting reading with much greater precision than is normally possible with other photometering means employing an indicator needle.

Various modifications to the abovedescribed means are of course possible without departure from the principles of the invention. For example, display of all values Emax, Emin, and Emid may be effected automatically, instead of the display of Emax and Emin values being dependent on external switch action.

Also, display 10 may be used for direct indication of the brightness levels rather than the exposure times. To do this, the output of the amplifier A1 and transistor LT1 circuit of FIG. 3 is supplied directly to the maximum value detection circuit 3 and the minimum value detection circuit 4, instead of being passed through operational circuit 2. In this case, the exposure time may be calculated by an operational circuit such as circuit 2 which also receives input from the amplifier A2 and transistor LT2 circuit, or the brightness information for calculating exposure time may be supplied from output terminal 1c (FIG. 1) of the amplifier A2 and transistor LT2 circuit. As noted earlier, the amplifier A2 and transistor LT2 circuit receives input from all the photodiodes except one at any given time, and so produces an output indicating the of overall brightness of the objective scene. Alternatively, the means of the invention may be provided with a switch means which need not be a separate means, but could be the switch means for actuating the start circuit S of FIG. 5, for example, and which causes the exposure time to be calculated on the basis of the output from the amplifier A1 and transistor LT1 circuit and a display to be given in display 10 for photographing objective scenes for which the exposure time is difficult to judge, and which causes the exposure time to be calculated on the basis of the output of the amplifier A2 and transistor LT2 circuit when the photographer judges that special information on the objective scene brightness is unnecessary.

The means of the invention may of course also be employed for display of the required lens aperture for particular set values of exposure time. In this case, wiper W2 of potentiometer PM2 in FIG. 3 is set to different positions in correspondence to the different exposure times.

Referring now to FIG. 7 which illustrates a modification of the above described means, the maximum value detection circuit 3' and minimum value detection circuit 4' are supplied inputs from the operational circuit 2 through a digital-analog converter 25. The digital number values Emax and Emin are supplied through suitable decoding means to display unit 29 to provide a dot display 30. The Emid value, which is calculated in the same manner as described above by calculation circuit 24, is supplied to adder 27 and to subtractor 28, each of which also receives an input from encoder 26. The value of the output from encoder 26 depends on an externally set input to encoder 26 indicating the latitude L of the film employed. The units of film latitude L encoded by encoder 26 are suitable units employed to represent steps in APEX indices, i.e., 5Ev for each unit change of value of film latitude, and the output from encoder 26 to adder 27 and 28 represents the value $\frac{1}{2}$L. The sum and the difference of the film latitude information supplied by encoder 26 and the Emin value supplied by calculation circuit 24 are determined by adder 27 and subtractor 28, respectively, which supply signals indicating of the results determined through suitable decoding means to display unit 31 to provide a dot display 32 in which the upper value is equal to Emid+$\frac{1}{2}$L and the lower value is Emid−$\frac{1}{2}$L, i.e., the range indicated by dot display 32 corresponds to the film latitude and is centred on the value of Emid. Dot display 32 is provided alongside dot display 31, thus permitting a photographer to determine at a glance whether or not the brightness range of the objective scene exceeds the latitude of the film employed.

FIG. 8 illustrates as an alternative construction of maximum value detection circuit 3". A register circuit 33 which is constituted as a latch circuit, receives a signal from terminal 2a through A - D converter 25', and supplies a signal to a conventionally known comparator circuit. The content of register 33 is shifted in a single transfer and is compared with the content of a latch circuit 35 by a comparator 34. When the content of latch circuit 35 is equal to or greater than the content of register 33, comparator 34 supplies a "1" signal along line 34a to latch circuit 35. The content of register 33 is read when a "1" signal is supplied by comparator 34, and so after completion of the scanning of photodiodes P1 to P25, the content of latch circuit 35 indicates the highest value received by register 33. This value is supplied to the next stage after completion of the scanning. The circuit configuration of FIG. 8 may be employed as a minimum value detection circuit if an inverter is included on line 34a.

Referring now to FIGS. 9 through 12, there is shown another embodiment of the invention in which the display indicates the brightness of portions of the objective scene selected by the photographer.

In FIG. 9, image-wise light from the objective scene to be photographed is passed through objective lens 201 to half-mirror 202, and passes through half-mirror 202 to aperture 206 to impinge on photodiode 207 and is also reflected by half-mirror 202 onto mirror 203 which directs the light to eye-lens 204 of a viewfinder system through which the objective scene may be viewed by photographer 205. Aperture 206 permits spot viewing of the objective scene, i.e., viewing of successive very small portions of the objective scene, with the angle of view being limited to 1°, for example. The input terminals of operational amplifier 208 are connected across opposite terminals of photodiode 207 and diode 209 is provided connecting the output terminal of amplifier 208 to the inverting input terminal thereof, to constitute a known circuit for production of output signals proportional to the logarithm of the intensity of light incident on photodiode 207. These output signals are supplied to an analog-digital (A - D) converter 210 and converted to digital output signals. These digital output signals are supplied through normally open switch 211 to contact terminal 217, through normally open switch 212 to memory 214 whose output is supplied to contact terminal 218 and calculation block 222, and through normally open switch 213 to memory 215 whose output is supplied to contact terminal 219 and calculation block 222. Contact terminals 217, 218, and 219 are successively and alternately connected by periodic switch 216 to decoder 220 which supplies an output signal to dot display 221.

As shown in FIG. 10, dot display 221 is constituted by a row of photoemissive elements L1'–L15' which are provided in a viewfinder system 225 and which may be viewed by the photographer observing the objective scene through viewfinder system 225. When connections are established through switches 211, 212, 213, and 216, particular diodes L1'–L15' corresponding to the values of output of A - D converter 210 and of memories 214 and 215 light up to give the photographer an indication of these values. Viewfinder system 225 comprises a center indicator 226 which indicates the center of the view seen in system. The portion of the objective scene seen at the center indicator 226 is the portion of the objective scene from which light is reflected onto the abovementioned photodiode 207.

Referring back to FIG. 9, data specification block 223 encodes an externally set input relating to shutter speed for example, and supplies a corresponding signal k to calculation block 222, which performs a calculation similar to that performed by the abovedescribed calculation 24 (FIG. 5) of the 1st embodiment, but using signals from memories 214 and 215 instead of the Emax and Emin values. The result of the calculation performed by calculation block 222 is supplied through a suitable decoding means to segment display unit 224, which gives a display indicating the required stop number for the given values of luminance information and shutter speed. This circuit may of course be used to display other types of information. For example, if the input from data specification block 223 to calculation block 222 relates to lens aperture, a display indicating the required shutter speed can be produced in segment display unit 224.

As shown in FIG. 11, the segment display unit 224 is suitably provided on the upper rear portion of a camera 227 comprising viewfinder eyepiece 228, through which the objective scene to be photographed and dot display 221 may be viewed, and provided with grip 229 for support of camera 227. On grip 229 there is provided a switch 230, which is suitably a two or three stage push-button switch, and serves to close switches 212, 213, and 211, in that order, if it is a three-stage switch and switches 212 and 213, in that order if it is a two-stage switch, a separate switch being provided for closure of switch 211 in the latter case. At least switches 212 and 213 are re-opened immediately after their closure by switch 230.

Referring to FIGS. 9, 10, and 11 the use and action of the abovedescribed means is as follows. The photographer views the objective scene through eyepiece 228 and at this time a value indicating the luminance of the portion of the scene visible at center indicator 226 is produced by A - D converter 210, but is not yet supplied as an input to subsequent stages, since switches 211, 212, and 213 are open. The photographer directs camera 227 so that the portion of the objective scene whose level of brightness the photographer wishes to record, for example the brightest portion of the objective scene, is viewable at the location of center indicator 226, and then partially depresses switch 230, thus closing switch 212. Thereupon, switch 212 temporarily closes to permit the current value of the output from A - D converter 210 to be stored in memory 214, and then re-opens. Switch 216, which is suitably actuated by initial depression of switch 230, moves constantly to successive contacts 217, 218, and 219 permitting the content of memory 214 to be displayed by dot display unit 221. At a given moment, switch 216 may not be closed on contact 218 of memory 214, but because of visual memory, the photoemissive element which corresponds to the value of memory 214 content appears emit light constantly.

The same procedure is followed by the photographer and the same action results in recording in memory 215 and display by display unit 219 of a value indicating the brightness of another portion of the objective scene, preferably a portion which contrasts with the first portion. When this is done, calculation block 222 receives input from all its input terminals and produces a corresponding output for display in segment display unit 224.

If switch 230 is depressed further, or a separately provided switch is actuated, switch 211 is closed and the brightness of the portion of the objective scene currently in line with center indicator 226 also is displayed in dot display unit 221. If a separate push-button switch which automatically opens when not depressed by the photographer is provided for switch 211, it is possible to scan and determine the brightness of different portions of the objective scene. For work by professional photographers and some special applications it is possible to cause switch 211 to close and remain closed upon initial depression of a separate switch or of switch 230, switches 212 and 213 being subsequently closed by further actuation of switch 230. With this arrangement it is possible to obtain a display that changes continuously in accordance with changes of brightness of different portions of the scene brought into line with the center indicator.

In this embodiment of the invention, and also in the first embodiment, it is easily possible to effect a fixed or moving display indicating the level of brightness of a larger number of portions of the objective scene, although again such a display is more suitable for the professional or specialist photographer.

Figure 12:
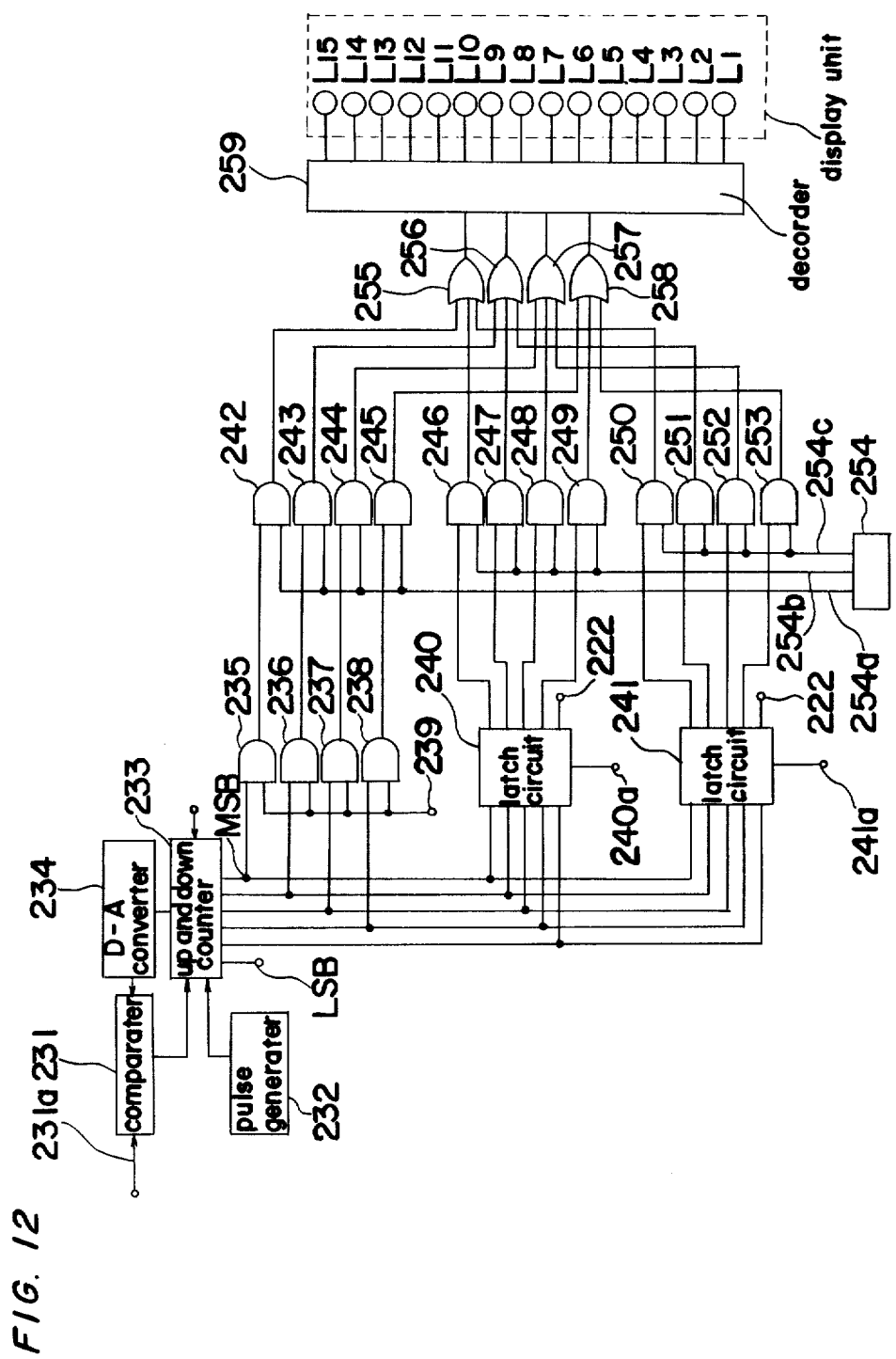
FIG. 12 is a schematic circuit diagram of a portion of the means of FIG. 9.

FIG. 12 shows the details of a circuit employable to achieve the action of the circuit of FIG. 9. In FIG. 12 light information signals from photodiodes and their associated circuits such as described above are supplied along input line 231a to comparator 231. Comparator 231 compares this input with the input from from D - A converter 234 and supplies input signals indicating the results of this comparison to up/down counter 233. The content of up/down counter 223 is increased by the input of a clock pulse from pulse generator 232 each time a signal is received from comparator 231. The content of up/down counter 223 and whose content is supplied to D - A converter 233. Counter 234 has six output terminals for binary output. The least significant bit is not used to supply counter output to subsequent stages, but is held at ¼ Ev, to avoid a content consisting entirely of "0" in counter 233. The four upper order bits are supplied, at a level of 1Ev, to two-input AND gates 235–238, latch circuit 240, and latch circuit 241. Different AND gates 235–238 receive are connected to different output terminals of counter 233, and all receive an input from terminal 239 corresponding to switch 211 of FIG. 9. Latch circuits 240 and 241 store the content of counter 233 upon receipt of input signals from terminals 240a and 241a respectively. The content of counter 233 is supplied through latch circuits 240 and 241 to calculation block 222. AND gates 235, 236, 237, and 238 respectively supply input signals to AND gates 242, 243, 244, and 245 which each have two input terminals and also may receive a input along line 254a from circular counter 254. The content of latch circuit 240 is supplied to AND gates 246–249 which each have two input terminals and also may receive input along line 254b from circular counter 254, and content of latch circuit 241 is supplied to AND gates 250–253, each of which have two input terminals and also may receive input along line 254c from circular counter 254. The output from each of these sets of AND gates is supplied to a single set of OR gates 255–258, each of which receives an input from just one of the AND gates in each set. These OR gates 255–258 supply output through decoder 259 to actuate particular elements in the set of photoemissive elements L1'–L15' constituting a dot display.

What is claimed is:
1. An exposure meter comprising:
a luminance detection means for detecting the luminance of a plurality of portions of an objective scene, and for producing output information corresponding to the luminance of said plurality of portions of said objective scene;
a first memory means connected to said luminance detection means for recording said output information corresponding to the luminance of a first portion of said plurality of portions of said objective scene;
a second memory means connected to said luminance detection means for recording said output information corresponding to the luminance of a second portion of said plurality of portions of said objective scene; and
a display means connected to said first and second memory means for providing a simultaneous comparison display of said output information recorded in said first and second memory means for indicat- ing a luminance range defined between the luminances of said first and second portions of said objective scene.

2. An exposure meter as claimed in claim 1, wherein: said display means comprises a plurality of photoemissive elements, each photoemissive element corresponding to one of a plurality of luminance ranges, disposed in a row in order of the intensity of luminance and a means for lighting a first photoemissive element corresponding to said output information recorded in said first memory means and a second photoemissive element corresponding to said output information recorded in said second memory means, whereby said luminance range is indicated by the distance between said first and second photoemissive elements which provide a simultaneous display of said output information stored in said first and second memory means.

3. An exposure meter as claimed in claim 1, further comprising a calculation means connected to said first and second memory means for performing a calculation for obtaining the median value using the output information recorded in said first and second memory means and for producing an output indicating the results of said calculation.

4. An exposure meter as claimed in claim 3, wherein said display means is connected to said calculation means and further comprises a calculation display means for indicating said output of said calculation means simultaneously with display of said output information recorded in said first and second memory means.

5. An exposure meter as claimed in claim 4, wherein: said calculation means comprises a means for performing said calculation according to the following formula; $C=(A-B)K+B$, wherein C is the value to be calculated, A is the output information recorded in said first memory means, B is the output information recorded in said second memory means and K is a predetermined constant in the range $0 \leq K \leq 1$.

6. An exposure meter as claimed in claim 5, further comprising:
a maximum brightness detection means connected to said luminance detection means and said first memory means for detecting the portion of said objective scene having the maximum luminance and for recording said output information corresponding to said maximum luminance in said first memory means; and
a minimum brightness detection means connected to said luminance detection means and said second memory means for detecting the portion of said objective scene having the minimum luminance and for recording said output information corresponding to said minimum luminance in said second memory means.

7. An exposure meter as claimed in claim 6, further comprising:
a constant setting means connected to said calculation means for selectively setting said predetermined constant K in the range $0 \leq K \leq 1$.

8. An exposure meter as claimed in claim 1, wherein said luminance detection means comprises a plurality of light-receiving elements each for detecting the luminance of one of said plurality of portions of said objective scene.

9. An exposure meter as claimed in claim 8, wherein said luminance detection means further comprises:

a scanning means connected to said plurality of light-receiving elements for scanning the outputs from successive light-receiving elements of said plurality of light-receiving elements in a time-wise sequence; and
a logarithmic compression means connected to said scanning means for logarithmically compressing said outputs scanned by said scanning means, and for producing corresponding outputs.

10. An exposure meter as claimed in claim 9, further comprising:
a maximum value detection means connected to said logarithmic compression means and said first memory means for detecting the maximum value of said output of said logarithmic compression means and for recording said maximum value in said first memory means; and
a minimum value detection means connected to said logarithmic compression means and said second memory means for detecting the minimum value of said output of said logarithmic compression means and for recording said maximum value in said second memory means.

11. An exposure meter as claimed in claim 10, wherein said display means further comprises an operator settable film latitude display means for indicating the film latitude simultaneously with said simultaneous comparison display.

12. An exposure meter as claimed in claim 1, wherein said luminance detection means comprises:
a single light detecting element of small acceptance angle; and
a light directing means for selectively directing the light received from one of said plurality of portions of said objective scene to said single light detecting element.

13. An exposure meter as claimed in claim 12, further comprising:
a first manually actuated recording enable means connected to said luminance detection means and said first memory means for recording said output information of said luminance detection means in said first memory means when actuated, whereby output information corresponding to said first portion of said objective scene selected by said light directing means is stored in said first memory means; and
a second manually actuated recording enable means connected to said luminance detection means and said second memory means for recording said output information of said luminance detection means in said second memory means when actuated, whereby output information corresponding to said second portion of said objective scene selected by said light directing means is stored in said second memory means.

14. An exposure meter as claimed in claim 13, wherein said display means further comprises a current output display means for indicating the current output of said luminance detection means simultaneously with said simultaneous comparison display.

15. An exposure meter comprising:
a first detection means for producing an output indicating the level of brightness of the brightest portion of an objective scene;
a second detection means for producing an output indicating the level of brightness of the darkest portion of an objective scene; and a calculation means connected to said first and second detection means for performing a calculation on the outputs of said first and second detection means according to the following formula: $C=(A-B)K+B$, wherein C is the value to be calculated, A is the output of said first detection means, B is the output of said second memory means and K is a predetermined constant, said calculation means further comprising means for selectively setting said predetermined constant K in the range $0 \leq K \leq 1$.

16. An exposure meter comprising:

a single light detecting element of small acceptance angle for producing an output indicating the luminance within said small acceptance angle;

a light directing means for selectively directing light from one portion of a plurality of portions of an objective scene to said single light detecting element;

a manually actuated memory means connected to said single light detecting element for recording at least one output of said single light detecting element indicating the luminance of at least one portion of said objective scene selected by said light directing means when actuated; and a display means connected to said single light detecting means and said manually actuated memory means for simultaneously displaying the current value of said output of said single light detecting element and said at least one output of said single light detecting element recorded in said manually actuated memory means.

17. An exposure meter comprising:

a light detecting means having one photosensitive element for producing an output indicating the intensity of light received in a small acceptance angle;

a selective light directing means for selectively directing light from one portion of a plurality of portions of an objective scene into said small acceptance angle of said light detecting means;

first and second memory means each connected to said light detecting means;

a memory enable means connected to said first and second memory means having first and second manual actuation means for recording in said first memory said output indicating the intensity of light from a first portion of said objective scene selected by said selective light directing means when said first manual actuating means is actuated and for recording in said second memory means said output indicating the intensity of light from a second portion of said objective scene selected by said selective light directing means when said second manual actuating means is actuated;

a calculation means connected to said first and second memory means for calculating a value according to the following formula: $C=(A-B)K+B$, wherein C is the value to be calculated, A is the output recorded in said first memory means, B is the output recorded in said second memory means and K is a predetermined constant in the range $0 \leq K \leq 1$; and an indicating means connected to said calculating means for indicating the value calculated by said output means.

18. An exposure meter as claimed in claim 17, further comprising:

a constant setting means connected to said calculation means for selectively setting said predetermined constant K in said range $0 \leq K \leq 1$.

19. An exposure meter as claimed in claim 17, further comprising:

a viewing means for viewing said portion of said objective scene selected by said selective light directing means falling within said small acceptance angle.

20. An exposure meter as claimed in claim 17, further comprising:

a display means connected to said first and second memory means for displaying said output recorded in said first and second memory means.

21. An exposure meter as claimed in claim 20, further comprising:

a current output indicating means connected to said light detecting means for synchronously indicating the output of said light detecting means.

22. An exposure meter as claimed in claim 21, wherein:

said indicating means and said current output indicating means each comprise means for providing an indication comparable to the other of said means of said outputs applied thereto.

* * * * *